INVENTOR:-
RANDLE LESLIE ABBOTT

United States Patent Office 3,426,623
Patented Feb. 11, 1969

3,426,623
CHANGE-SPEED EPICYCLIC GEARING AND ASSOCIATED CONTROL MEANS
Randle Leslie Abbott, Leamington Spa, England, assignor to Auto Transmissions Limited, London, England
Filed Nov. 28, 1966, Ser. No. 597,463
Claims priority, application Great Britain, Jan. 12, 1966, 13,630/66
U.S. Cl. 74—781   9 Claims
Int. Cl. F16h 3/78, 57/10

ABSTRACT OF THE DISCLOSURE

The invention concerns a change-speed epicyclic gearing having power input and output elements, a reaction member, and an axially movable toothed coupling rotatively fast and coaxial therewith. A coaxial first complementary toothed coupling is fast with a nonrotary casing, and a coaxial second complementary toothed coupling is rotatively fast with one of the said elements. Control means are provided for moving the axially movable toothed coupling optionally from a neutral position into engagement with the first complementary toothed coupling to provide the epicyclic ratio or into engagement with the second complementary toothed coupling to provide the direct drive ratio. Synchronising means are arranged to inhibit nonsynchronous engagement of the axially movable toothed coupling with either the first or the second complementary toothed coupling.

---

The invention relates to a change-speed epicyclic gearing and also to an associated control means and is particularly, but not exclusively, concerned with a change-speed epicyclic gearing and an associated control means of the type that is employed as an auxiliary change-speed gearing in the power transmission system of a motor road vehicle. I have previously proposed several arrangements of automotive change-speed epicyclic gearings and associated control means in which a frusto-conical friction engaging member rotatively fast with a reaction sun gear wheel is optionally movable between a position in which it engages a nonrotary brake surface to provide the planetary ratio, and a position in which it engages a clutch surface rotatively fast with an output or input annulus gear wheel to provide a direct drive condition. For controlling the engagement of the ratios in these hitherto proposed arrangements I have employed fluid-operable pistons and cylinders acting in opposition to springs, together with unidirectional clutches and sophisticated fluid circuits for providing smooth engagement and disengagement of the ratios. Although these previously proposed arrangements have given very successful results, there is a demand for a cheaper unit and an object of this invention is to provide a change-speed epicyclic gearing and associated control means to fulfill this demand.

According to the invention a change-speed epicyclic gearing has a power input element, a power element, a reaction member, an axially movable toothed coupling rotatively fast and coxial with the reaction member, a first complementary toothed coupling rotatively fast with a non-rotary casing and coaxial with the axially movable toothed coupling, a second complementary toothed coupling rotatively fast with one of said elements and coaxial with the axially movable toothed coupling, control means adapted to move the axially movable toothed coupling from a neutral position in which it is disengaged from both the first and second complementary toothed couplings optionally to a first position in which it is engaged with the first complementary toothed coupling to provide the epicyclic ratio or to a second position in which it is engaged with the second complementary toothed coupling to provide the direct drive ratio, and synchronising means arranged operatively between the couplings to inhibit nonsynchronous engagement of the axially movable toothed coupling with either of the two complementary toothed couplings. In this manner no unidirectional clutches or fluid-operable pistons and cylinders with associated fluid circuits and fluid controls are required and there is consequently a substantial saving in the cost.

The synchronising means may, according to a further feature, be a synchromesh unit having two synchronising friction members, one of the synchronising friction members being operated by the movement of the axially movable toothed coupling to brake the reaction member to the nonrotary casing prior to the engagement of the axillay movable toothed coupling with the first complementary toothed coupling, and the other of the synchronising friction members being operated by the movement of the axially movable toothed coupling to clutch the reaction member to the said one element prior to the engagement of the axially movable toothed coupling with the second complementary toothed coupling. Alternatively the synchronising means may, according to another feature, be a pair of synchronism detectors, one of the synchronism detectors is arranged operatively between the axially movable toothed coupling and the nonrotary casing to prevent the axially movable toothed coupling from engaging the first complementary toothed coupling until the reaction member is substantially at rest, and the other synchronism detector is arranged operatively between the axially movable toothed coupling and the said one element to prevent the axially movable toothed coupling from engaging the second complementary toothed coupling until the reaction member is rotating at substantially the same speed as the said one element. Preferably the reaction member is a sun gear wheel and the element to which the second complementary toothed coupling is rotatively fast is a planet carrier supporting a plurality of planet gear wheels meshing with the sun gear wheel and the other epicyclic gear element.

Due to the omission of the fluid-operable pistons and cylinders and their associated fluid circuits and fluid controls, there is no need for a supply of fluid under substantial pressure for operating the pistons and accordingly the usual pump is no longer required. However, the operating fluid is also used for lubricating the gearing and some other means for promoting a flow of lubricant will be required if forced lubrication is required and there is to be any saving made by omitting the pump that originally supplied both the lubricant and the fluid pressure for operating the pistons. To achieve this end the other epicyclic gear element may be an annulus gear wheel that is partially immersed in a lubricant reservoir defined by the casing, and a scoop is arranged above the axis of rotation of the annulus gear wheel with a minimum working clearance from the annulus gear wheel and is connected to the lubrication system of the epicyclic gearing such that the rotation of the annulus gear wheel will cause lubricant to be entrained and to flow through the scoop into the lubrication system.

The control means may include a control lever movable from a first position to a second position, means urging the control lever into whichever of said positions it occupies, an axially movable gear-changing fork operatively associated with annular thrust faces on the axially movable toothed coupling whereby axial movement of the gear-changing fork between a first position and a second position will slide the axially movable toothed coupling between its first and second positions, a first spring means adapted when loaded to move the gear-changing fork to its first position, a second spring means adapted when loaded to move the gear-changing fork to its second position, and means interconnecting the control lever and the first and second spring means whereby movement of the control lever from its first to its second position will unload the first spring means and will load the second spring means, and movement of the control lever from its second to its first position will unload the second spring means and will load the first spring means. Preferably the control lever is connected by a pivot to a swinging link such that the pivot will pass through a dead centre position intermediate the said first and second positions of the control lever, and the aforesaid means for urging the control lever into whichever of the first and second positions that it occupies is a spring urging the swinging link and the control lever away from the dead centre position of their common pivot.

The invention is now described, by way of example only, with reference to the accompanying drawings, in which.

Figure 1:
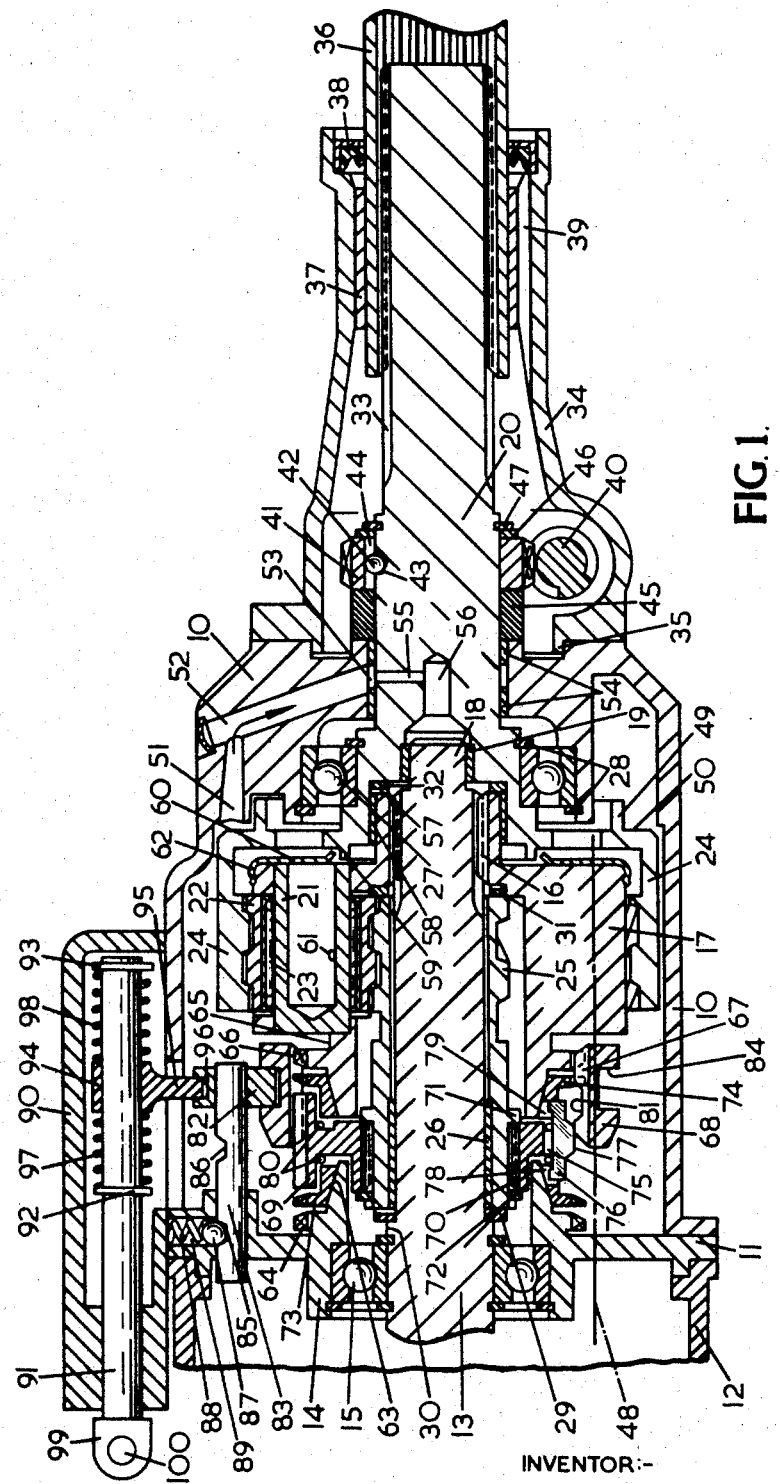
FIGURE 1 is a longitudinal section through an auxiliary change-speed epicyclic gearing for a motor road vehicle and through part of the associated control means.

In FIGURE 1 the auxiliary change-speed epicyclic gearing is arranged in a casing 10 secured by unshown longitudinally-directed bolts through an end plate 11 to a casing 12 housing a main change-speed gearing. The latter may be of any desired construction and, as it does not form part of the present invention, it is not described further excepting that it has a power input shaft 13 which is supported from a boss 14 formed integral with the end plate 11 by a combined journal and thrust bearing 15 and extends into the casing 12. The end of the power output shaft 13 of the main change-speed gearing is provided with splines 16 drivingly engaged with corresponding splines of a planet carrier 17, and is also provided with a coaxial cylindrical nose 18 which is supported by a bush 19 in a power output shaft 20 of the auxiliary change-speed gearing. Thus, the shaft 13 also constitutes the power input shaft to the auxiliary change-speed gearing and will hereafter be denoted as such.

The planet carrier 17 supports three equispaced hollow pins 21, only one of which is shown, and each pin 21 supports a helically toothed planet gear wheel 22 through a needle roller bearing 23. The three planet gear wheels 22 mesh with an annulus gear wheel 24 formed integral with the power output shaft 20, and also with a sun gear wheel 25 mounted coaxially on the power input shaft 13 for the auxiliary change-speed gearing through a bush 26 which allows relative rotation. The annulus gear wheel 24 and the power output shaft 20 are supported from the casing 10 by a combined thrust and journal bearing 27 which is located axially by two spring clips 28 so that the axial thrust produced by the helical teeth of the annulus gear wheel 24 will not cause any axial displacement. The sun gear wheel 25 is also prevented from moving axially, due to the axial thrust produced by its helical teeth, by means of an annular thrust washer 29 bearing against a shoulder 30 formed in the power input shaft 13 whereby thrusting of the sungear wheel 25 to the left in FIGURE 1 is resisted by the end plate 11 through the bearing 15. Two further annular thrust washers 31 and 32 are arranged one between the sun gear wheel 25 and the planet carrier 17, and the other between the planet carrier 17 and the power output shaft 20 from the auxiliary change-speed gearing whereby thrusting of the sun gear wheel 25 to the right in FIGURE 1 is resisted by casing 10 through the bearing 27.

The power output shaft 20 has its end remote from the annulus gear wheel 24 formed with splines 33 and extending through an extension casing 34 which is secured to the casing 10 by a spigot 35 and unshown studs and nuts. An internally splined propeller shaft 36 is drivingly engaged with the splines 33 and is rotatively and slidingly supported by bush 37 carried by the extension casing 34— this arrangement simplifies the construction of the propeller shaft 36 which only has a pair of universal joints and does not require a separate telescopic coupling, the function of the latter being taken over by axial sliding of the propeller shaft 36 along the splines 33. An oil seal 38 prevents loss of lubricant from the casing 34, and a passage 39 prevents accumulation of lubricant between the bush 37 and the oil seal 38. A speedometer worm drive 40 is mounted in the bottom of casing 34 for driving a flexible speedometer drive in the usual manner and meshes with a gear wheel 41 which is drivingly secured to the power output shaft 20 by means of a steel ball 42 that is located in a blind radial bore 43 in the power output shaft 20 and engages an axial groove 44 formed in the gear wheel 41. The gear wheel 41 is spaced from the casing 10 by a tubular member 45 and is located on the other side by a washer 46 and a spring clip 47 engaging an annular groove in the power output shaft 20.

The casing 10 defines a lubricant reservoir of which the normal level is indicated by the chain dotted line 48. The annulus gear wheel 24 has an integral coaxial annular ring 49 extending from its radial face 50, and it will be seen from FIGURE 1 that the ring 49 dips into the lubricant. Rotation of the annulus gear wheel 14 causes lubricant to be entrained by the ring 49 and the radial face 50, and the entrained lubricant is collected by a scoop 51 which is formed in the casing 10 at a minimum working distance from the annulus gear wheel 24. The lubricant collected by the scoop 51 flows through a drilling 52 to an annular gallery 53 defined between a pair of axially spaced bushes 54 arranged intermediate the casing 10 and the power output shaft 20. The lubricant flows from the annular gallery 53 through a radial bore 55 in the power output shaft 20 to a coaxial drilling 56, through an unshown longitudinal slot in the bush 19, through a series of radial slots 57 in the annular thrust washer 32, and through an unshown longitudinal slot in a bush 58 arranged between the annulus gear wheel 24 and the splined boss of the planet carrier 17. From the unshown longitudinal slot in the bush 58, the lubricant is thrown radially outwards and is guided by a coaxial annular ring 59, formed integral with the annulus gear wheel 24, into the path of a catcher plate 60 which deflects the lubricant into the three hollow pins 21. Lubricant then passes from the interior of each pin 21 through a radial port 61 to lubricate the needle roller bearings 23 supporting the planet gear wheels 22. As shown in FIGURE 1, the catcher plate 60 is in the form of a generally annular sheet metal pressing having a cylindrical rim 62 which is spun into engagement with the outer periphery of the planet carrier 17 and additionally serves to locate the pins 21. A proportion of the lubricant delivered through the drilling 56 will pass through the splines to lubricate the bush 26 and the annular thrust washers 29 and 31. The rest of the gearing and its controls are splash lubricated.

The sun gear wheel 25 constitutes the reaction member of the gearing and provision is made, as will be described later, for optionally locking the sun gear wheel 25 to a nonrotary casing so that the power output shaft 20 will be driven at the epicyclic ratio faster than the power input shaft 13, or locking the sun gear wheel 25 to a rotary element of the gearing whereby to inhibit the epicyclic action of the gearing so that the power output shaft 20 will be driven at the same speed as the power input shaft 13.

The boss 14 of the end plate 11 has a coaxial extension defining a frusto-conical brake surface 63 and a peripheral series of dog teeth 64 constituting a toothed coupling. The planet carrier 17 also is formed with a coaxial extension defining a frusto-conical clutch surface 65 and a peripheral series of dog teeth 66 constituting another toothed coupling. The toothed couplings 64 and 66 have the same number of teeth and are alternatively engageable by the splines 67 of an axially slidable collar 68. The splines 67 are slidably engaged with corresponding splines in the periphery of a synchroniser hub 69, but both ends of the splines 67 are chamfered as shown to facilitate their engagement with the toothed couplings 64 and 66—thus, the collar 68 constitutes an axially movable toothed coupling. The synchroniser hub 69 is held rotatively fast with the sun gear wheel 25 by splines 70 and is axially located by means of an annular flange 71 formed integral with the sun gear wheel 25 and by a spring clip 72. A pair of synchroniser rings 73 and 74 having the same number of teeth as the axially movable toothed coupling 68, coact respectively with the frusto-conical surfaces 63 and 65. The synchroniser hub 69 is formed in its periphery with three equally spaced longitudinally directed slots 75 in each of which is slidingly arranged a synchroniser plate 76 in the form of a small pressing having a central hump 77 with inclined sides. Each synchroniser plate 76 has its ends permanently engaged in slots 78 and 79 formed respectively in the synchroniser rings 73 and 74 so that the latter are at all times driven by the synchroniser hub 69 through the three synchroniser plates 76. A pair of light expander rings 80 are carried by the synchroniser hub 69 and serve to urge each synchroniser plate 76 radially outwards so that its central hump 77 will lie in a corresponding depression 81 in the adjacent internal splines 67 of the synchroniser hub 69 when the latter is in the neutral position, that is disengaged from both of the toothed couplings 64 and 66.

The axially movable toothed coupling 68 is shown in FIGURE 1 locking the sun gear wheel 25 to the toothed coupling 66 carried by the planet carrier 17 so that the power input shaft 13 will drive the power output shaft 20 at the same speed. To engage the epicyclic overdrive ratio, the axially movable toothed coupling 68 is first moved leftwards to its neutral condition when it is disengaged from the toothed coupling 66 and the synchroniser ring 74 and the central humps 77 of the synchroniser plates 76 lie in the corresponding depressions 81 in the splines 67. Subsequent contamination of this leftward movement of the axially movable toothed coupling 68 causes the synchroniser plates 76 to be moved with it until they abut the bottoms of the slots 78 thereby pushing the synchronising ring 73 against the brake surface 63 to bring the sun gear wheel 25 to rest. The force of engagement of the synchronising ring 73 with the brake surface 63 will increase as the force applied to the left on the axially movable toothed coupling 68 increases, until it reaches a maximum at the point where the inclined sides of the humps 77 and the corresponding depressions 81 interact to urge the synchroniser plates 76 radially inwards to the position in which they no longer obstruct the leftward movement of the axially movable toothed coupling 68. Provided that the sun gear wheel 25 has been braked to rest, the axially movable toothed coupling 68 will move leftwards engaging the peripheral teeth of the synroniser ring 73 and the toothed coupling 64 thereby locking the sun gear wheel 25 to the nonrotary end plate 11 so that the power input shaft 13 will drive the power output shaft 20 at the planetary overdrive ratio. However, each slot 78 is formed wider than the thickness of the corresponding synchroniser plate 76 so that the synchroniser ring 73 is capable of limited angular movement relative to the synchroniser hub 69. Due to this construction, the frictional drag between the synchroniser ring 73 and the brake surface 63 will cause the synchroniser ring 73 to move angularly relative to the synchroniser hub 69 so that its peripheral teeth will be out of alignment with the internal spline teeth 67 thereby baulking further leftward movement of the axially movable toothed coupling 68 until synchronism has been achieved. Each slot 79 in the synchroniser ring 74 is also formed wider than the thickness of the corresponding synchroniser plate 76, and it will therefore be understood that the engagement of the axially movable toothed coupling 68 with the toothed coupling 66 as shown in FIGURE 1 is achieved in exactly the same manner as just described with the exception that the synchroniser ring 74 serves to accelerate the sun gear wheel 25 from rest to the speed of the power input shaft 13 and the planet carrier 17.

For moving the axially movable toothed coupling 68 between the positions in which it respectively engages the toothed ocuplings 64 and 66, a selector form 82 is secured to an axially movable slide 83 supported by a coacting bore in the end plate 11 and engages a peripheral groove 84 formed in the axially movable toother coupling 68. The axially movable slide 83 is formed with a pair of recesses 85 and 86 for alternate engagement by a ball detent 87 which is urged radially towards the slide 83 by a compression coil spring 88 arranged in a bore 89 in the end plate 11 and reacting against a cover plate 90. As shown in FIGURE 1, the ball detent 87 engages the recess 85 when the axially movable toothed coupling 68 engages the toothed coupling 66, and it will be understood that the ball detent 87 will engage the recess 86 when the axially movable toothed coupling 68 engages the toothed coupling 64.

Figure 2:
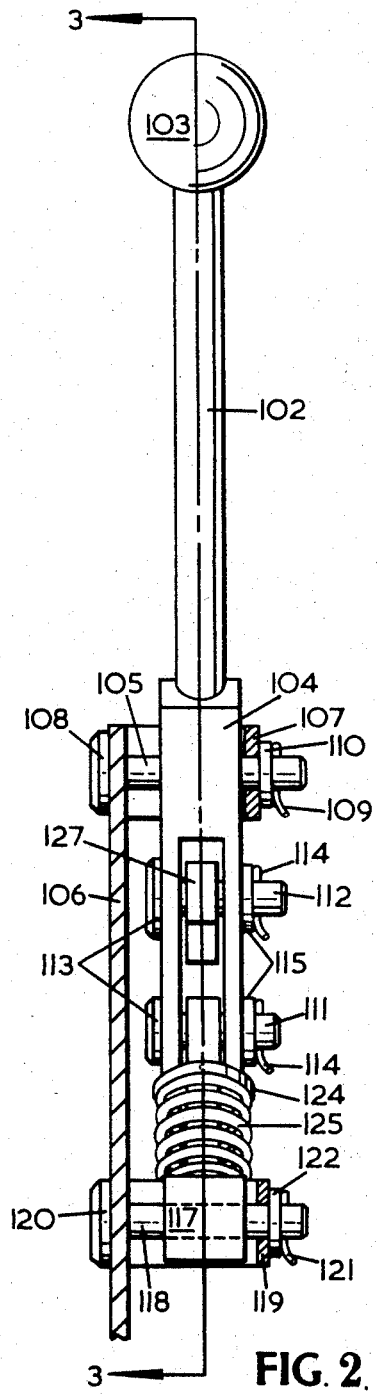
FIGURE 2 is a longitudinal end view of a control lever for the control means shown in FIGURE 1.
Figure 3:
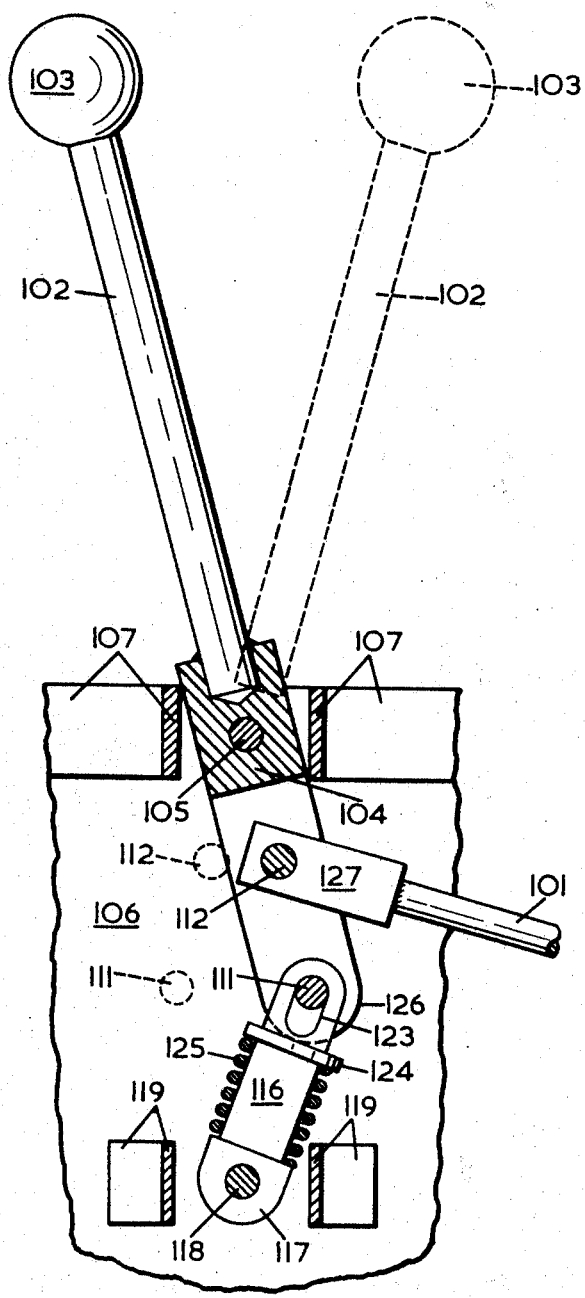
FIGURE 3 is a section taken on the line 3—3 of FIGURE 2.

A selector shaft 91 is mounted for axial sliding in the cover plate 90 which latter is secured to the casing 10 and the end plate 11 by unshown studs and nuts. Inside the cover plate 90, the selector shaft 91 is provided with two peripheral grooves in which are engaged respective spring clips 92 and 93. A boss 94 is slidably mounted on the selector shaft 91 intermediate the spring clips 92 and 93, and is formed integral with a selector finger 95 which engages a slot 96 formed in the selector fork 82. A pair of preloaded compression coil springs 97 and 98 are arranged coaxially around the selector shaft 91 respectively between the spring clips 92 and 93 and the boss 94. In this manner the springs 97 and 98 tend to centralise the boss 94 between the spring clips 92 and 93, and any relative axial movement between the selector shaft 91 and the boss 94 will cause a spring load to be applied to the boss 94 in the same direction. Outside the cover plate 90, the selector shaft 91 is formed integral with a boss 99 having a bore 100 for an unshown pivot pin that is carried by the broken-off end of a pivoted link 101 which is shown in FIGURES 2 and 3 and is for moving the selector shaft 91 axially between two extreme positions as will be described in detail later. In FIGURE 1, the selector shaft 91 is shown in its extreme righthand position and it will be noted that the spring 97 has been compressed so that a resultant force to the right is applied to the boss 94 whereby the selector fork 82 biases the axially movable toothed coupling 68 to the right to engage the toothed coupling 66. Similarly, if the selector shaft 91 is moved to its extreme lefthand position, the spring 98 will be compressed to apply a resultant force to the left on the boss 94 so that the selector fork 82 will bias the axially movable toothed coupling 68 to the left to engage the toothed coupling 64.

With reference to FIGURES 2 and 3, a control lever 102 has a hand-grippable knob 103 secured to its upper end and has its lower end spigoted and welded to a bifurcated extension 104 which is supported by a transverse pivot pin 105 extending between a chassis frame member 106 and a generally U-shaped bracket 107 secured to the chassis frame member. The pivot pin 105 has an enlarged head 108 bearing against the side of the chassis frame member 106 and is axially located by a split pin 109 and an associated washer 110 bearing bearing against the bracket 107. The bifurcated extension 104 carries a transverse pivot pin 111 at the ends of its bifurcated limbs and a further transverse pivot pin 112 intermediate the pivot pins 105 and 111. Both pivot pins 111 and 112 are formed integral with enlarged heads 113 and are located axially by means of split pins 114 and associated washers 115 as shown in FIGURE 2.

An arm 116 has its bottom end secured to boss 117 which is supported by a transverse pivot pin 118 extending between the chassis frame member 106 and a second generally U-shaped bracket 119 secured to the chassis frame member. The pivot pin 118 has an enlarged head 120 bearing against the side of the chassis frame member 106 and is axially located by a split pin 121 and an associated washer 122 bearing against the bracket 119. The top end of the arm 116 extends between the limbs of the bifurcated extension 104 and is formed with a longitudinal slot 123 in which the pivot pin 111 is engaged with lost motion. As will be seen best from FIGURE 3, the engagement of the pivot pin 111 with the slot 123 allows the control lever 102 to move the arm 116 from the position shown through an arc until the pivot pin 111 reaches the dotted line position. The arm 116 is of rectangular section and has a washer 124 with a corresponding central aperture mounted as a sliding fit on it. A preloaded compression coil spring 125 is arranged around the arm 116 and reacts between the washer 124 and the boss 117 whereby to urge the washer against the ends of the limbs of the bifurcated extension 104 which limbs are radiused at 126 about the centre of the pivot pin 111. As movement of the lever 102 from the position shown in full lines in FIGURE 3 towards the dotted line position will cause the pivot pin 111 to slide along the slot 123 towards the pivot pin 118, the radiused ends 126 of the limbs of the bifurcated extension 104 will act against the washer 124 to compress the spring 125 to a greater extent. Thus the control lever 102 with its bifurcated extension 104 and the arm 116 work with a toggle action so that the spring 125 will urge the pivot pin 111 to the appropriate extreme end position as soon as the control lever 102 has been correspondingly moved past the dead centre position of the pivot pin 111 between the pivot pins 105 and 118.

The pivot pin 112 is connected to an enlarged end 127 of the pivoted link 101 so that movement of the control lever 102 will be transmitted to the selector shaft 91 shown in FIGURE 1. The force produced by the compression coil spring 125 is arranged to be sufficient to overcome either of the compression coil springs 97 and 98 so that movement of the control lever 102 will cause an instantaneous movement of the selector shaft 91. However, the time taken for moving the control lever 102 between its extreme positions will leave insufficient time for the synchroniser rings 73 or 74 to operate, and it is important to note that the movement of the selector shaft 91 merely loads one of the springs 97 or 98 to a sufficient extent for appropriately engaging the axially movable toothed coupling 68 with the toothed coupling 66 or 64 after synchronism has occurred. In this manner operation of the control lever 102 cannot cause the axially movable toothed coupling 68 to engage either of the toothed couplings 66 or 64 before synchronism has occurred, and it is also impossible to overload the synchroniser rings 73 or 74.

Figure 4:
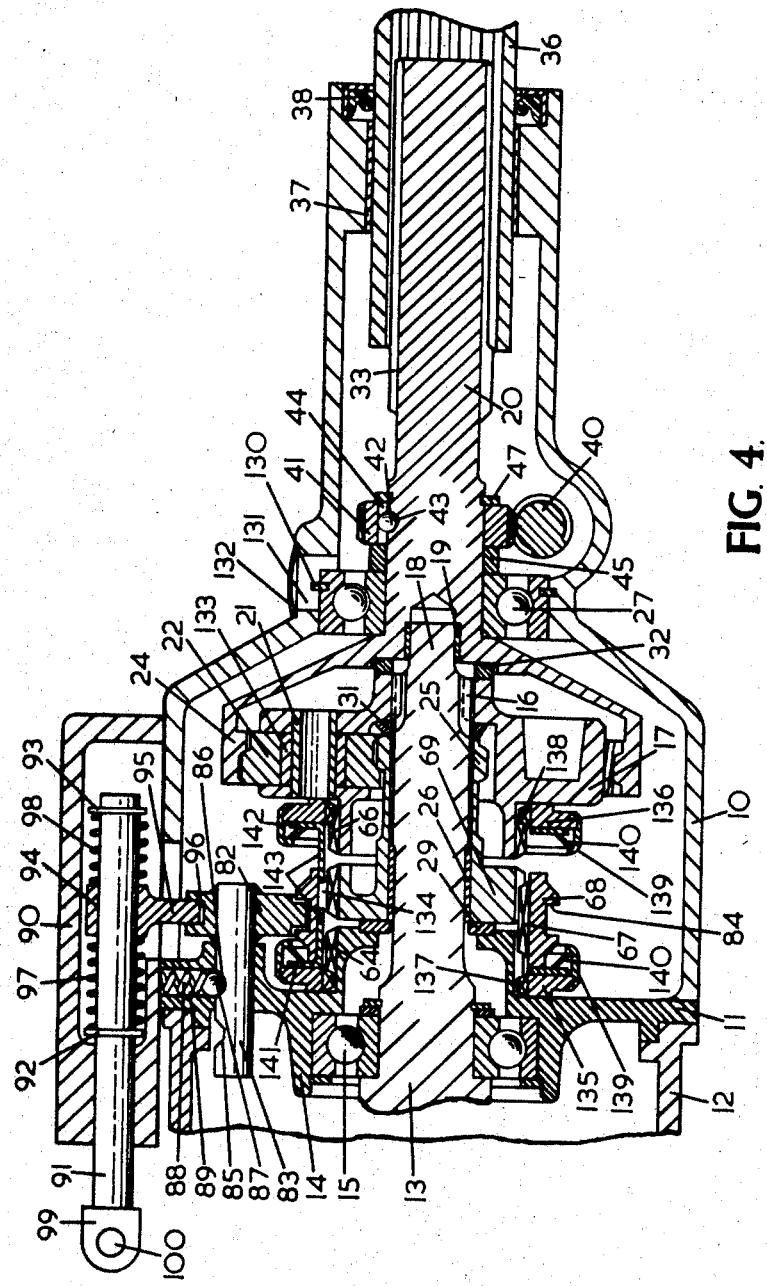
FIGURE 4 is a longitudinal section similar to FIGURE 1 but illustrating a modified arrangement.

The embodiment shown in FIGURES 4 to 8 is similar in many respects to that already described and accordingly corresponding reference numerals have been employed to identify corresponding components. The controls for moving the selector fork 82 are precisley the same as described with reference to FIGURES 1 to 3, and the principle differences shown in FIGURE 4 concern the engagement of the axially movable toothed coupling 68 with the toothed couplings 64 and 66. Other differences are that the embodiment shown in FIGURE 4 is of simplified construction as splash lubrication is utilised, the extension casing 34 being formed integral with the casing 10, and the combined thrust and journal bearing 27 being secured to the combined thrust and journal bearing 27 being secured to the casing 10 by a single spring clip 130 which engages annular grooves formed in the outer race and in the casing 10. The spring clip 130 is inserted through an aperture 131 in the top of the casing 10 which is afterwards sealed by a core plug 132. Instead of the needle roller bearings 23, the planet gear wheels 22 are supported from the pins 21 by plain bushes 133. The annular thrust washer 29 bears against the boss 14 instead of the shoulder 30 on the power input shaft 13, and the the synchroniser hub 69 is formed integral with the sun gear wheel 25.

The axially movable toothed coupling 68 is slidably engaged with the synchroniser hub 69 through splines 67 as before but is formed with three equispaced longitudinal slots 134. A pair of hubs 135 and 136 are connected by respective splines 137 and 138 to the toothed couplings 64 and 66. Each of the hubs 135 and 136 is provided with a rim 139 which is secured by a swaging operation and serves as an abutment for a frusto-conical spring washer 140. A pair of synchronism detector rings 141 and 142 are arranged respectively between the frusto-conical spring washers 140 and the hubs 135 and 136. In this manner the synchronism detector ring 141 is urged by its frusto-conical spring washer 140 into braking engagement with the hub 135, and the synchronism detector ring 142 is urged by its frusto-conical spring 140 into clutching engagement with the hub 136. Both of the synchronism detector rings 141 and 142 are capable of rotation under load relative to their respective hubs 135 and 136 and are formed integral with three equispaced longitudinally directed fingers 143 which are permanently engaged by the longitudinal slots 134. Thus the two synchronism detector rings 141 and 142 are drivingly connected to the axially movable toothed coupling 68 such that the synchronism detector ring 141 will slip relatively to its hub 135 when the axially movable toothed coupling 68 is engaged with the toothed coupling 66, and the synchronism detector ring 142 will slip relatively to its hub 136 when the axially movable toothed coupling 68 is engaged with the toothed coupling 64 as shown in FIGURE 4.

Figure 5:
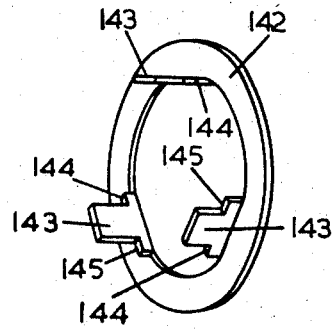
FIGURE 5 is a perspective view of one of the synchronism detector rings shown in FIGURE 4, and FIGURES 6, 7 and 8 are diagrams illustrating the operation of the synchronism detector ring shown in FIGURE 5.

The synchronism detector rings 141 and 142 have similar proportions and are in the form of sheet steel pressings. FIGURE 5 shows the synchronism detector ring 142 in perspective so that its form can be readily comprehended. From this figure it will be seen that the longitudinally directed fingers 143 are each provided with a pair of shoulders 144 and 145 which are utilised to detect synchronism between the axially movable toothed coupling 68 and the hub 136 which is of course rotatively fast with the toothed coupling 66.

Figure 6:
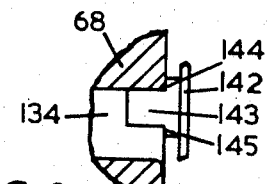
Figure 7:
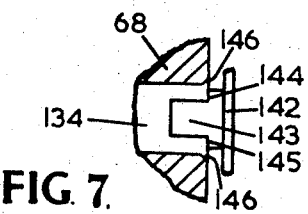
Figure 8:
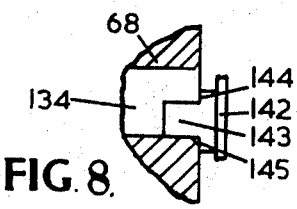

The operation of the synchronism detector ring 142 is now described with reference to FIGURES 6 to 8 which are diagrams looking radially outwardly from the centre of the synchronism detector ring 142 into one of the lnogitudinal slots 134 in the axially movable toothed coupling 68. When the axially movable toothed coupling 68 is disengaged from the toothed coupling 64 it is rotatively stationary but the frictional drag between the synchronism detector ring 142 and its hub 136 tends to drive the axially movable toothed coupling 68. As the longitudinal slots 134 are wider than the narrow end of the fingers 143, the transmission of drive from the fingers 143 to the axially movable toothed coupling 68 causes misalignment as shown in FIGURE 6 so that further axial movement of the axially movable toothed coupling 68 to engage the toothed coupling 66 is inhibited by the shoulder 144. However, after the axially movable toothed coupling has been accelerated to synchronism with the toothed coupling 66, the fingers 143 tend to align themselves with the longitudinal slots 134 as shown in FIG- URE 7 so that the axially movable coupling 68 can be moved to engage the toothed coupling 66. To assist the shoulders 144 and 145 to enter the longitudinal slots 134, the latter have their openings chamfered as indicated at 146 in FIGURE 7. FIGURE 8 illustrates the operation of the synchronism detector ring 142 under reverse torque conditions, when the shoulder 145 inhibits engagement of the axially movable toothed coupling 68 with the toothed coupling 66 until synchronism occurs. The function of the synchronism detector ring 141 is exactly as just described with the exception that the axially movable toothed coupling 68 is being decelerated to rest prior to engaging the toothed coupling 64.

Although the invention has been specifically described with reference to an overdrive auxiliary gearing, it could readily be applied to an underdrive auxiliary gearing the only major alteration being transferring the functions of the shafts 13 and 20.

What I claim as my invention and desire to secure by Letters Patent of the United States is:

1. A change-speed epicyclic gearing, including a power input element, a power output element, a reaction member, an axially movable toothed coupling rotatively fast and coaxial with the reaction member, a nonrotary casing, a first complementary toothed coupling rotatively fast with the nonrotary casing and coaxial with the axially movable toothed coupling, a second complementary toothed coupling rotatively fast with one of said elements and coaxial with the axially movable toothed coupling, the axially movable toothed coupling movable to a neutral position in which it is disengaged from both the first and second complementary toothed couplings, the axially movable toothed coupling movable to a first position in which it is engaged with the first complementary toothed coupling, the changespeed epicyclic gearing arranged to provide an epicyclic drive ratio between said input and output elements when the axially movable toothed coupling is engaged with the first complementary toothed coupling, the axially movable toothed coupling movable to a second position in which it is engaged with the second complementary toothed coupling, the change-speed epicyclic gearing arranged to provide a direct drive ratio between said input and output elements when the axially movable toothed coupling is engaged with the second complementary toothed coupling, control means arranged to move the axially movable toothed coupling from the neutral position optionally to the first position or to the second position, synchronising means arranged operatively between the couplings to inhibit nonsynchronous engagement of the axially movable toothed coupling with either of the two complementary toothed couplings, an annulus gear wheel constitutes one of said epicyclic gear elements, lubricant for said epicyclic gearing, a casing defining a reservoir for said lubricant, the annulus gear wheel partially immersed in the lubricant, a scoop arranged above the axis of rotation of the annulus gear wheel, the scoop arranged with a minimum working clearance from the annulus gear wheel whereby rotation of the annulus gear wheel will cause lubricant to be entrained and to flow into the scoop, means defining a lubrication system for the epicyclic gearing and the scoop connected to deliver lubricant to the lubrication system.

2. A change-speed epicyclic gearing, as in claim 1, including a control lever constituting part of the said control means, the control lever movable from a first position to a second position, means arranged to urge the control lever into whichever of said positions it occupies, the axially movable toothed coupling defining two opposed thrust faces, an axially movable gear-changing fork operatively associated with the annular thrust faces whereby axial movement of the gear-changing fork between a first and a second position will slide the axially movable toothed coupling between its first and second positions, a first spring means arranged when loaded to move the gear-changing fork to its first position, a second spring means arranged when loaded to move the gear-changing fork to its second position, and means interconnecting the control lever and the first and second spring means whereby movement of the control lever from its first to its second position will unload the first spring means and will load the second spring means, and movement of the control lever from its second to its first position will unload the second spring means and will load the first spring means.

3. A change-speed epicyclic gearing, including a power input element, a power output element, a reaction member, an axially movable toothed coupling rotatively fast and coaxial with the reaction member, a nonrotary casing, a first complementary toothed coupling rotatively fast with the nonrotary casing and coaxial with the axially movable toothed coupling, a second complementary toothed coupling rotatively fast with one of said elements and coaxial with the axially movable toothed coupling, the axially movable toothed coupling movable to a neutral position in which it is disengaged from both the first and second complementary toothed couplings, the axially movable toothed coupling movable to a first position in which it is engaged with the first complementary toothed coupling, the changespeed epicyclic gearing arranged to provide an epicyclic drive ratio between said input and output elements when the axially movable toothed coupling is engaged with the first complementary toothed coupling, the axially movable toothed coupling movable to a second position in which it is engaged with the second complementary toothed coupling, the change-speed epicyclic gearing arranged to provide a direct drive ratio between said input and output elements when the axially movable toothed coupling is engaged with the second complementary toothed coupling, control means arranged to move the axially movable toothed coupling from the neutral position optionally to the first position or to the second position, synchronising means arranged operatively between the couplings to inhibit nonsynchronous engagement of the axially movable toothed coupling with either of the two complementary toothed couplings, a control lever constitutes part of the said control means, the control lever movable from a first position to a second position, means arranged to urge the control lever into whichever of said positions it occupies, the axially movable toothed coupling defining two opposed thrust faces, an axially movable gear-changing fork operatively associated with the annular thrust faces whereby axial movement of the gear-changing fork between a first and a second position will slide the axially movable toothed coupling between its first and second positions, a first spring means arranged when loaded to move the gear-changing fork to its first position, a second spring means arranged when loaded to move the gear-changing fork to its second position, and means interconnecting the control lever and the first and second spring means whereby movement of the control lever from its first to its second position will unload the first spring means and will load the second spring means, and movement of the control lever from its second to its first position will unload the second spring means and will load the first spring means.

4. A change-speed epicyclic gearing, as in claim 3, including a swinging link, a pivot, the pivot connecting the swinging link to the said control lever, the control lever arranged such that the pivot will pass through a dead centre position intermediate the said first and second positions of the control lever, and a spring means urging the swinging link and the control lever away from the dead centre position of their common pivot, said spring means constituting the aforesaid means for urging the control lever into whichever of the first and second positions that it occupies.

5. A change-speed epicyclic gearing, as in claim 4, including an annulus gear wheel constituting one of said epicyclic gear elements, lubricant for said epicyclic gearing, a casing defining a reservoir for said lubricant, the annulus gear wheel partially immersed in the lubricant, a scoop arranged above the axis of rotation of the annulus gear wheel, the scoop arranged with a minimum working clearance from the annulus gear wheel whereby rotation of the annulus gear wheel will cause lubricant to be entrained and to flow into the scoop, means defining a lubrication system for the epicyclic gearing and the scoop connected to deliver lubricant to the lubrication system.

6. A change-speed epicyclic gearing, as in claim 3, including two synchronism detectors constituting said synchronising means, one of the synchronism detectors arranged operatively between the axially-movable toothed coupling and the said nonrotary casing, the other of the synchronism detectors arranged operatively between the axially movable toothed coupling and the said one element, the said one synchronism detector arranged to inhibit the engagement of the axially movable toothed coupling with the first complementary toothed coupling until the reaction member is substantially at rest, and said other synchronism detector arranged to inhibit the engagement of the axially movable toothed coupling with the second complementary toothed coupling until the said reaction member is rotating at substantially the same speed as the said one element.

7. A change-speed epicyclic gearing, as in claim 6, including a swinging link, a pivot, the pivot connecting the swinging link to the said control lever, the control lever arranged such that the pivot will pass through a dead centre position intermediate the said first and second positions of the control lever, and a spring means urging the swinging link and the control lever away from the dead centre position of their common pivot, said spring means constituting the aforesaid means for urging the control lever into whichever of the first and second positions that it occupies.

8. A change-speed epicyclic gearing, as in claim 6, including an annulus gear wheel constituting one of said epicyclic gear elements, lubricant for said epicyclic gearing, a casing defining a reservoir for said lubricant, the annulus gear wheel partially immersed in the lubricant, a scoop arrange above the axis of rotation of the annulus gear wheel, the scoop arranged with a minimum working clearance from the annulus gear wheel whereby rotation of the annulus gear wheel will cause lubricant to be entrained and to flow into the scoop, means defining a lubrication system for the epicyclic gearing and the scoop connected to deliver lubricant to the lubrication system.

9. A change-speed epicyclic gearing, as in claim 6, including a swinging link, a pivot, the pivot connecting the swinging link to the said control lever, the control lever arranged such that the pivot will pass through a dead centre position intermediate the said first and second positions of the control lever, and a spring means urging the swinging link and the control lever away from the dead centre position of their common pivot, said spring means constituting the aforesaid means for urging the control lever into which ever of the first and second positions that it occupies.

References Cited

UNITED STATES PATENTS

| | | | |
|---|---|---|---|
| 2,022,096 | 11/1935 | Thompson | 192—53 |
| 2,317,423 | 4/1943 | Vincent | 74—781 X |
| 2,699,073 | 1/1955 | Flinn | 74—781 X |
| 2,896,479 | 7/1959 | Kelbel | 74—781 |
| 3,146,637 | 9/1964 | Whateley et al. | 74—781 |
| 3,295,394 | 1/1967 | Whateley | 74—781 |
| 3,296,895 | 1/1967 | Karlsson | 74—781 |

ARTHUR T. McKEON, *Primary Examiner.*

U.S. Cl. X.R.

192—53

UNITED STATES PATENT OFFICE
CERTIFICATE OF CORRECTION

Patent No. 3,426,623　　　　　　　　　　　　February 11, 1969

Randle Leslie Abbott

It is certified that error appears in the above identified patent and that said Letters Patent are hereby corrected as shown below:

In the heading to the printed specification, line 8, "13,630/66" should read -- 1,363/66 --.

Signed and sealed this 14th day of April 1970.

(SEAL)
Attest:

Edward M. Fletcher, Jr.　　　　　　　　WILLIAM E. SCHUYLER, JR.
Attesting Officer　　　　　　　　　　　　Commissioner of Patents